United States Patent
Hara et al.

(10) Patent No.: US 10,066,129 B2
(45) Date of Patent: Sep. 4, 2018

(54) ANTI-FOULING ADHESIVE SHEET, AND ANTI-FOULING TREATMENT METHOD FOR A STRUCTURE USING SAID ANTI-FOULING ADHESIVE SHEET

(71) Applicant: NITTO DENKO CORPORATION, Ibaraki-shi, Osaka (JP)

(72) Inventors: Kazutaka Hara, Ibaraki (JP); Naoki Kurata, Ibaraki (JP); Tomonari Naito, Ibaraki (JP); Satoru Suzuki, Ibaraki (JP); Taiki Sueyoshi, Ibaraki (JP); Kouji Maruyama, Ibaraki (JP)

(73) Assignee: NITTO DENKO CORPORATION, Ibaraki-shi, Osaka (JP)

( * ) Notice: Subject to any disclaimer, the term of this patent is extended or adjusted under 35 U.S.C. 154(b) by 139 days.

(21) Appl. No.: 14/425,187

(22) PCT Filed: Aug. 30, 2013

(86) PCT No.: PCT/JP2013/073270
§ 371 (c)(1),
(2) Date: Mar. 2, 2015

(87) PCT Pub. No.: WO2014/038478
PCT Pub. Date: Mar. 13, 2014

(65) Prior Publication Data
US 2015/0218420 A1    Aug. 6, 2015

(30) Foreign Application Priority Data

Sep. 4, 2012 (JP) .................................. 2012-193887

(51) Int. Cl.
*C09D 5/16* (2006.01)
*B32B 37/18* (2006.01)
(Continued)

(52) U.S. Cl.
CPC ............. *C09J 7/0239* (2013.01); *B32B 3/263* (2013.01); *B32B 7/12* (2013.01); *B32B 37/1284* (2013.01);
(Continued)

(58) Field of Classification Search
USPC ........................................ 156/60, 94, 304.5
See application file for complete search history.

(56) References Cited

U.S. PATENT DOCUMENTS 3,761,334 A * 9/1973 Zondek .................. B63B 59/04
114/222
4,200,676 A    4/1980 Caponigro et al.
(Continued)

FOREIGN PATENT DOCUMENTS

DE    92 13 633.8 U1    11/1993
JP    52-119684 A    10/1977
(Continued)

OTHER PUBLICATIONS

Machine Translation of Japanese Patent 2-296592, Date Unknown.*
(Continued)

*Primary Examiner* — Jeffry H Aftergut
(74) *Attorney, Agent, or Firm* — Sughrue Mion, PLLC

(57) ABSTRACT

The present invention provides an anti-fouling pressure-sensitive adhesive sheet and anti-fouling treatment method capable of preventing peeling from overlapping portions when adjacent anti-fouling pressure-sensitive adhesive sheets are attached by allowing end portions thereof to overlap each other. The anti-fouling pressure-sensitive adhesive sheet of the present invention includes a base material layer; a pressure-sensitive adhesive layer provided on one side of the base material layer; and an anti-fouling layer provided on another side of the base material layer, wherein the anti-fouling pressure-sensitive adhesive sheet has, at an (Continued)

end portion thereof, a bonding margin including parts of the base material layer and the pressure-sensitive adhesive layer, the parts extending beyond the anti-fouling layer.

6 Claims, 5 Drawing Sheets

(51) Int. Cl.
| | |
|---|---|
| C09J 7/02 | (2006.01) |
| B32B 7/12 | (2006.01) |
| B32B 3/26 | (2006.01) |
| B32B 37/12 | (2006.01) |
| C09J 7/29 | (2018.01) |
| B63B 59/00 | (2006.01) |
| C09J 133/08 | (2006.01) |

(52) U.S. Cl.
CPC ............... *B32B 37/18* (2013.01); *C09D 5/16* (2013.01); *C09D 5/1693* (2013.01); *C09J 7/29* (2018.01); *B32B 2037/1246* (2013.01); *B32B 2307/70* (2013.01); *B32B 2405/00* (2013.01); *B63B 59/00* (2013.01); *C09J 133/08* (2013.01); *C09J 2201/606* (2013.01); *C09J 2433/00* (2013.01); *C09J 2433/006* (2013.01); *Y10T 156/10* (2015.01); *Y10T 428/24488* (2015.01); *Y10T 428/24752* (2015.01)

(56) References Cited

U.S. PATENT DOCUMENTS

| | | | | |
|---|---|---|---|---|
| 4,359,502 | A | | 11/1982 | Caponigro et al. |
| 4,806,400 | A | * | 2/1989 | Sancaktar ............... B26D 3/02 |
| | | | | 428/192 |
| 5,803,010 | A | * | 9/1998 | Roy ......................... B63B 59/02 |
| | | | | 114/219 |
| 5,848,769 | A | * | 12/1998 | Fronek .................... B29D 7/00 |
| | | | | 244/130 |
| 7,070,850 | B2 | * | 7/2006 | Dietz ...................... B32B 27/08 |
| | | | | 244/130 |
| 2004/0241433 | A1 | | 12/2004 | Howard |
| 2006/0083915 | A1 | | 4/2006 | Howard |
| 2009/0169896 | A1 | | 7/2009 | Sohn et al. |
| 2009/0239060 | A1 | * | 9/2009 | Tomino ................... C09J 7/0296 |
| | | | | 428/323 |
| 2014/0356587 | A1 | * | 12/2014 | Hara ...................... B63B 59/045 |
| | | | | 428/189 |

FOREIGN PATENT DOCUMENTS

| | | | |
|---|---|---|---|
| JP | 58-13673 | A | 1/1983 |
| JP | 61-007937 | B2 | 3/1986 |
| JP | 1-212692 | A | 8/1989 |
| JP | 2-296592 | A * | 12/1990 |
| JP | 4-027076 | B2 | 5/1992 |
| JP | 6-33024 | A | 2/1994 |
| JP | 2000-129222 | A | 5/2000 |
| JP | 2006-192734 | A | 7/2006 |
| JP | 2006-526528 | A | 11/2006 |
| JP | 2007-160764 | A | 6/2007 |
| JP | 2008-50419 | A | 3/2008 |
| JP | 2011-116916 | A | 6/2011 |
| WO | WO-2012/063810 | A1 * | 5/2012 |
| WO | WO-2013/111634 | A1 * | 8/2013 |

OTHER PUBLICATIONS

Extended European Search Report dated Mar. 22, 2016 from European Patent Office in counterpart Application No. 13835574.8.
International Search Report for PCT/JP2013/073270 dated Nov. 12, 2013 [PCT/ISA/210].
Translation of claim 1 of JP 4-027076 (published May 8, 1992).

* cited by examiner (a)

(b)

(c)

(a)

(b)

(c)

ANTI-FOULING ADHESIVE SHEET, AND ANTI-FOULING TREATMENT METHOD FOR A STRUCTURE USING SAID ANTI-FOULING ADHESIVE SHEET

CROSS REFERENCE TO RELATED APPLICATIONS

This application is a National Stage of International Application No. PCT/JP2013/073270, filed on Aug. 30, 2013, which claims priority from Japanese Patent Application No. 2012-193887, filed on Sep. 4, 2012, the contents of all of which are incorporated herein by reference in their entirety.

TECHNICAL FIELD

The present invention relates to an anti-fouling pressure-sensitive adhesive sheet having a bonding margin, and an anti-fouling treatment method for a structure, which uses the anti-fouling pressure-sensitive adhesive sheet.

BACKGROUND ART

Hitherto, for the purpose of, for example, preventing adhesion of dirt or ice and snow, or preventing adhesion of a sessile organism such as a barnacle, it has been proposed that an anti-fouling sheet be attached onto a surface of each of various structures (for example, Patent Literature 1). When the anti-fouling sheet is attached onto a large area of a large structure or the like, it is necessary to attach a plurality of the anti-fouling sheets because of a limitation on increasing a sheet width. In this case, when a gap is present between adjacent anti-fouling sheets, the adhesion of dirt, a sessile organism, or the like occurs in the gap. In view of this, it is preferred that the anti-fouling sheets be attached without any gap.

As a method of attaching a plurality of anti-fouling sheets without any gap, for example, there are given amethod involving attaching the sheets so that end portions thereof abut on each other, and a method involving attaching the sheets so that end portions thereof overlap each other (for example, Patent Literature 2). In addition, in the case of thermoplastic sheets, there is a proposal of a method involving heating the overlapping end portions to activate a pressure-sensitive adhesive layer, followed by pressure bonding (for example, Patent Literature 3). However, in the method involving attaching the sheets so that end portions thereof abut on each other, shrinkage and expansion of the sheets need to be taken into consideration, and hence it is extremely difficult to actually eliminate the gap. In addition, in the method involving attaching the sheets so that end portions thereof overlap each other or the method involving heating, followed by pressure bonding, depending on the kind of anti-fouling layer or base material layer, a sufficient adhesive strength is not obtained and peeling occurs from the overlapping portions in some cases. Such peeling may be suppressed by enhancing the adhesive strength of the anti-fouling sheet, but in this case, there arises a problem in that it becomes extremely difficult to peel and remove a worn-out anti-fouling sheet from the surface of the structure, which causes a significant reduction in workability at the time of attachment of a fresh sheet.

CITATION LIST

Patent Literature

[PTL 1] JP 2006-192734 A
[PTL 2] JP 4-27076 B
[PTL 3] JP 61-7937 B

SUMMARY OF INVENTION

Technical Problem

The present invention has been made in order to solve the above-mentioned problem, and an object of the present invention is to provide an anti-fouling pressure-sensitive adhesive sheet and anti-fouling treatment method capable of preventing peeling from overlapping portions when adjacent anti-fouling pressure-sensitive adhesive sheets are attached by allowing end portions thereof to overlap each other.

Solution to Problem

According to one aspect of the present invention, an anti-fouling pressure-sensitive adhesive sheet is provided. The anti-fouling pressure-sensitive adhesive sheet includes a base material layer; a pressure-sensitive adhesive layer provided on one side of the base material layer; and an anti-fouling layer provided on another side of the base material layer, wherein the anti-fouling pressure-sensitive adhesive sheet has, at an end portion thereof, a bonding margin including parts of the base material layer and the pressure-sensitive adhesive layer, the parts extending beyond the anti-fouling layer.

In a preferred embodiment, the bonding margin has a base material layer-side surface thereof subjected to easy-adhesion treatment.

In a preferred embodiment, the bonding margin has, at an end portion thereof, an inclined surface that is inclined so as to have a thickness decreasing from a base material layer-side surface toward a pressure-sensitive adhesive layer-side surface.

In a preferred embodiment, the anti-fouling layer has a poorly adhesive surface.

According to another aspect of the present invention, an anti-fouling treatment method for a structure is provided. The anti-fouling treatment method of the present invention includes sequentially attaching a plurality of the anti-fouling pressure-sensitive adhesive sheets onto a surface of a structure to be subjected to anti-fouling treatment so that the bonding margin of one of the anti-fouling pressure-sensitive adhesive sheets is overlapped by a pressure-sensitive adhesive layer surface of an adjacent other of the anti-fouling pressure-sensitive adhesive sheets.

In a preferred embodiment, the bonding margin is overlapped by the pressure-sensitive adhesive layer surface so that an overlapping width of the anti-fouling pressure-sensitive adhesive sheets is larger than a width of the bonding margin, and the anti-fouling treatment method further includes cutting off an overlapping portion beyond the bonding margin.

Advantageous Effects of Invention

The anti-fouling pressure-sensitive adhesive sheet according to the one embodiment of the present invention includes: a base material layer; a pressure-sensitive adhesive layer provided on one side of the base material layer; and an anti-fouling layer provided on another side of the base material layer, in which the anti-fouling pressure-sensitive adhesive sheet has, at an end portion thereof, a bonding margin including parts of the base material layer and the pressure-sensitive adhesive layer, the parts extending beyond the anti-fouling layer. When the adjacent anti-fouling pressure-sensitive adhesive sheet is attached by allowing its pressure-sensitive adhesive layer surface to overlap the base material layer-side surface of the bonding margin, the overlapping portions can be brought into firm adherence, and hence peeling from the portions can be suitably prevented.

DESCRIPTION OF EMBODIMENTS

<A. Anti-fouling Pressure-sensitive Adhesive Sheet>
<A-1. Entire Construction of Anti-fouling Pressure-sensitive Adhesive Sheet>

Figure 1A:
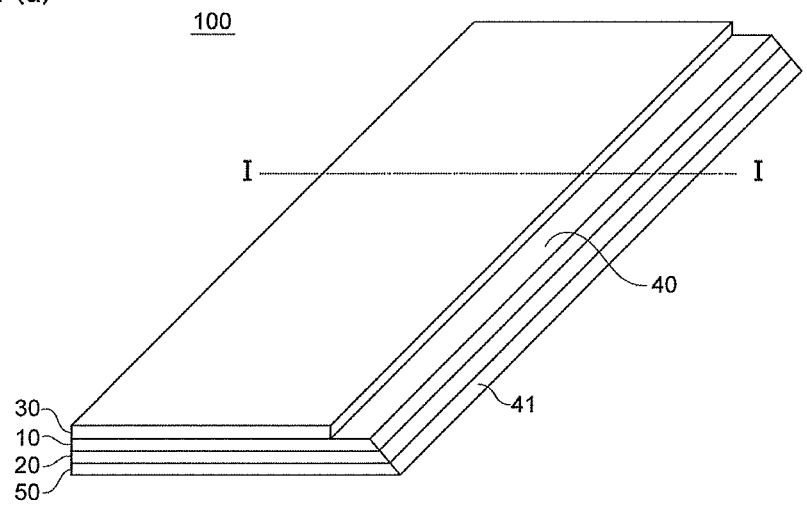
FIG. 1(a) is a schematic perspective view of an anti-fouling pressure-sensitive adhesive sheet according to a preferred embodiment of the present invention.
Figure 1B:
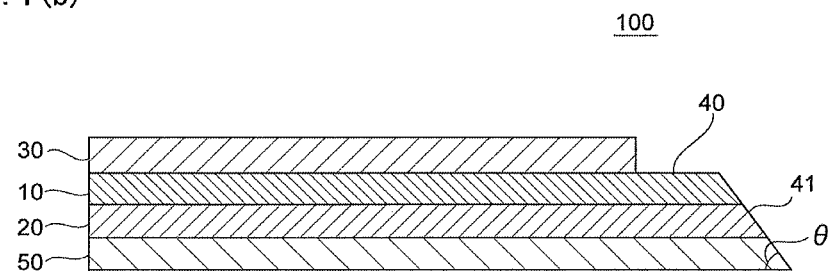
FIG. 1(b) is a schematic cross-sectional view taken along the line I-I of the anti-fouling pressure-sensitive adhesive sheet of FIG. 1(a).
Figure 2:
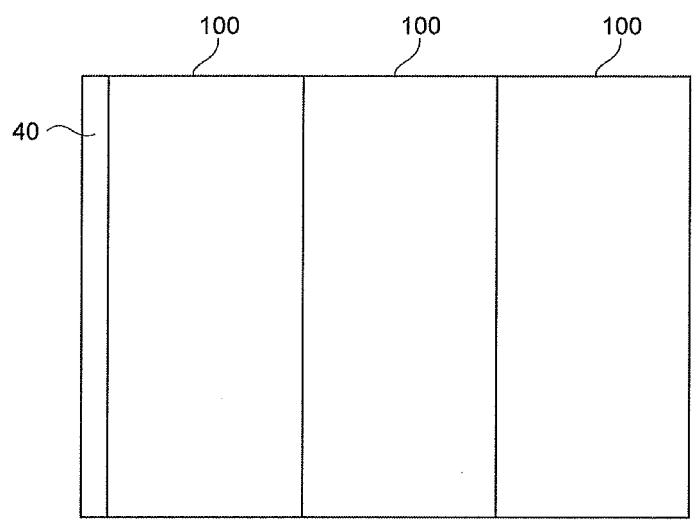
FIG. 2 is a schematic diagram illustrating a method of attaching the anti-fouling pressure-sensitive adhesive sheet of FIG. 1(a).

FIG. 1(a) is a schematic perspective view of an anti-fouling pressure-sensitive adhesive sheet according to a preferred embodiment of the present invention, and FIG. 1(b) is a schematic cross-sectional view taken along the line I-I of the anti-fouling pressure-sensitive adhesive sheet of FIG. 1(a). An anti-fouling pressure-sensitive adhesive sheet 100 includes a base material layer 10, a pressure-sensitive adhesive layer 20 provided on one side of the base material layer 10, and an anti-fouling layer 30 provided on the other side. The anti-fouling pressure-sensitive adhesive sheet 100 has, at one end portion in the longitudinal direction thereof, a bonding margin 40 including parts of the base material layer 10 and the pressure-sensitive adhesive layer 20, the parts extending beyond the anti-fouling layer 30. In addition, a release film 50 is provided on the pressure-sensitive adhesive layer 20 surface of the anti-fouling pressure-sensitive adhesive sheet 100. In most cases of a related-art anti-fouling pressure-sensitive adhesive sheet, an anti-fouling function is expressed by making an anti-fouling layer poorly adhesive through water-repellent treatment or the like, or by making a base material layer itself poorly adhesive without providing any anti-fouling layer, and attachment of such sheets by allowing end portions thereof to overlap each other has not provided a sufficient adhesive strength owing to their poorly adhesive surfaces. In contrast, when the anti-fouling pressure-sensitive adhesive sheet 100 having the bonding margin 40 is used, as illustrated in FIG. 2, adjacent anti-fouling pressure-sensitive adhesive sheets can be sequentially attached so as to overlap each other by allowing the bonding margin of one anti-fouling pressure-sensitive adhesive sheet to be overlapped by the pressure-sensitive adhesive layer surface of another anti-fouling pressure-sensitive adhesive sheet. As a result, even when the anti-fouling layer has a poorly adhesive surface, adjacent anti-fouling pressure-sensitive adhesive sheets can be attached so as to overlap each other by virtue of an excellent adhesive strength.

It is preferred that the bonding margin 40 have, at an end portion thereof, an inclined surface 41 that is inclined so as to have a thickness decreasing from the base material layer 10-side surface toward the pressure-sensitive adhesive layer 20-side surface. The formation of the inclined surface 41 as just described can prevent trapping of air when anti-fouling pressure-sensitive adhesive sheets are attached so as to overlap each other by allowing the bonding margin of one anti-fouling pressure-sensitive adhesive sheet to be overlapped by the other adjacent anti-fouling pressure-sensitive adhesive sheet. In addition, when the attachment is performed with the use of a liquid for attachment containing a surfactant for the purpose of, for example, preventing the trapping of air, the liquid for attachment can be easily pushed out from the resultant overlapping end portions. The inclination angle θ of the inclined surface 41 may be appropriately set depending on, for example, the thicknesses and physical properties of the base material layer 10 and the pressure-sensitive adhesive layer 20. From a similar viewpoint, the anti-fouling layer 30 may also have, at an end portion on the bonding margin 40 side thereof, an inclined surface that is inclined so as to have a thickness decreasing toward the base material layer 10-side surface.

Figure 3A:
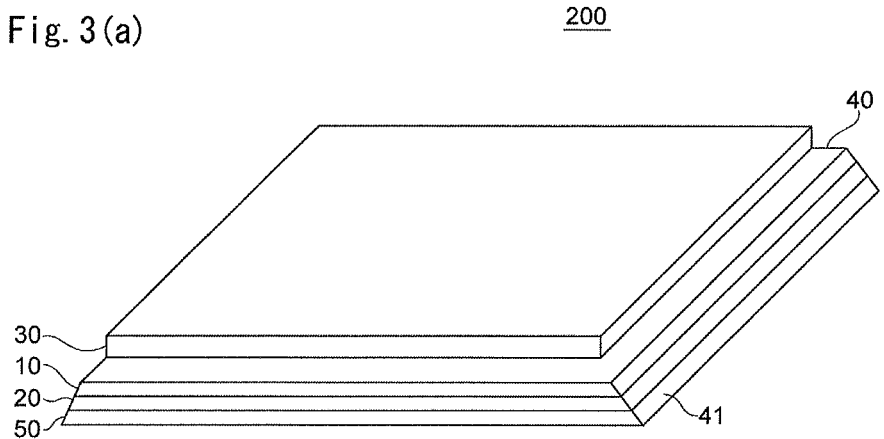
FIG. 3(a) is a schematic perspective view of an anti-fouling pressure-sensitive adhesive sheet according to another preferred embodiment of the present invention.
Figure 3B:
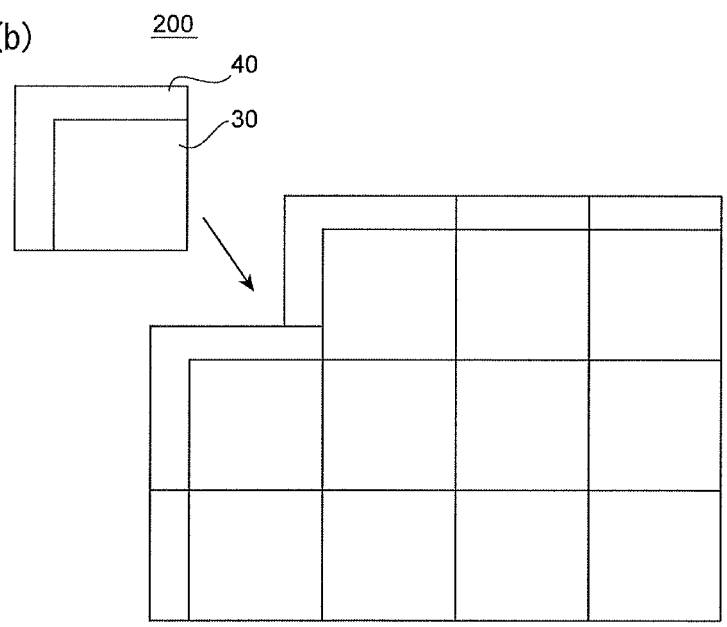
FIG. 3(b) is a schematic diagram illustrating a method of attaching the anti-fouling pressure-sensitive adhesive sheet of FIG. 3(a).

FIG. 3(a) is a schematic perspective view of an anti-fouling pressure-sensitive adhesive sheet according to another preferred embodiment of the present invention. An anti-fouling pressure-sensitive adhesive sheet 200 has, at end portions of two adjacent sides thereof, a bonding margin 40 having an L-shape in plan view, which includes parts of the base material layer 10 and the pressure-sensitive adhesive layer 20, the parts extending beyond the anti-fouling layer 30. When the anti-fouling pressure-sensitive adhesive sheet 200 having the bonding margin 40 is used, as illustrated in FIG. 3(b), adjacent anti-fouling pressure-sensitive adhesive sheets can be sequentially attached so that end portions of different anti-fouling pressure-sensitive adhesive sheets overlap the respective bonding margins at the end portions of the two sides.

The anti-fouling pressure-sensitive adhesive sheet 100 or 200 may further include any appropriate other layer (not shown). In addition, a release film may be provided on the anti-fouling layer 30 surface of the anti-fouling pressure-sensitive adhesive sheet.

The shape of the anti-fouling pressure-sensitive adhesive sheet of the present invention may be any appropriate shape depending on, for example, the shape of a structure. The shape is typically a rectangular shape, and may be, for example, an elongate shape. As used herein, the term "elongate shape" means that a length (longitudinal direction) is 10 or more times as large as a width (width direction). An anti-fouling pressure-sensitive adhesive sheet having an elongate shape can be supplied in a roll shape, and hence handling characteristics and workability can be improved.

The width or length of the anti-fouling pressure-sensitive adhesive sheet is set to any appropriate width or length depending on, for example, the shape of a structure. The width of the anti-fouling pressure-sensitive adhesive sheet may be, for example, 20 cm or more, and may be, for example, from 30 cm to 5 m.

The thickness of the anti-fouling pressure-sensitive adhesive sheet is set to any appropriate thickness depending on the thickness of each layer included therein within a range in which the effects of the present invention are not impaired. It is preferred that the thickness of the anti-fouling pressure-sensitive adhesive sheet be from 50 µm to 5,000 µm.

<A-2. Bonding Margin>

The width of the bonding margin is set to any appropriate width depending on, for example, the shape and dimensions of the anti-fouling pressure-sensitive adhesive sheet. The width of the bonding margin is, for example, 10 mm or more, preferably 20 mm or more. With such width, the function of the bonding margin can be sufficiently exhibited, and hence the effects of the present invention can be suitably obtained. The upper limit of the width of the bonding margin is, for example, 100 mm or less from the viewpoints of economic efficiency, workability, and the like.

An adhesive strength between the base material layer-side surface of the bonding margin and the pressure-sensitive adhesive layer is preferably equal to or higher than an adhesive strength between a surface of a structure to be subjected to anti-fouling treatment and the pressure-sensitive adhesive layer, more preferably higher than the adhesive strength between the surface of the structure and the pressure-sensitive adhesive layer. With this, when adjacent anti-fouling pressure-sensitive adhesive sheets are attached by allowing end portions thereof to overlap each other, the bonding margin (base material layer-side surface) of one pressure-sensitive adhesive sheet can be brought into extremely firm adherence to the pressure-sensitive adhesive sheet of another. As a result, peeling from overlapping portions can be suitably prevented without enhancing the adhesive strength between the surface of the structure and the anti-fouling pressure-sensitive adhesive sheet to such a level that the pressure-sensitive adhesive sheet is difficult to peel and remove. The adhesive strength between the base material layer-side surface of the bonding margin and the pressure-sensitive adhesive layer (180° peeling adhesive strength at 23° C. and a tension speed of 300 mm/min) is preferably 15 N/20 mm or more, more preferably 20 N/20 mm or more. It should be noted that when the anti-fouling pressure-sensitive adhesive sheet is peeled and removed from the surface of the structure, a plurality of pressure-sensitive adhesive sheets can be peeled off together, and hence the overlapping portions may achieve a bonded state to integrate the pressure-sensitive adhesive sheets.

The bonding margin may have the base material layer-side surface thereof subjected to easy-adhesion treatment as required. The easy-adhesion treatment can improve an adhesive strength for the pressure-sensitive adhesive layer to be allowed to overlap the base material layer-side surface. As the easy-adhesion treatment, there may be used any appropriate chemical surface treatment, physical surface treatment, and combination thereof. Specific examples thereof include: vapor deposition of a metal, an oxide, an inorganic substance, or the like; sputtering with oxygen, nitrogen, argon, or the like; plasma treatment; surface treatment with an acid such as hydrochloric acid, sulfuric acid, or nitric acid, an alkali such as sodium hydroxide or potassium hydroxide, or an organic solvent; UV/ozone irradiation; corona discharge treatment; flame treatment; application of a coupling agent; surface roughening treatment by mold shape transfer, sand blasting, or stretching and bending; and surface modification treatment by adding a filler, a coupling agent, or the like to a material for forming a base material.

In addition, onto the base material layer-side surface of the bonding margin, a material capable of reacting with a material for forming the pressure-sensitive adhesive layer so as to be bonded onto the pressure-sensitive adhesive layer may be applied.

<A-3. Base Material Layer>

Any appropriate base material layer may be adopted as the base material layer to the extent that the effects of the present invention are not impaired. A material for such base material layer is preferably excellent in water resistance, strength, flexibility, and breaking property. Examples of such material for the base material layer include a polyurethane resin, a polyurethane acrylic resin, a rubber-based resin, a vinyl chloride resin, a polyester resin, a silicone resin, an elastomer, a fluororesin, a polyamide resin, a polyolefin resin (such as polyethylene or polypropylene), a polystyrene resin, and a polycarbonate resin. The number of kinds of such materials for the base material layer may be only one, or may be two or more.

The elongation of the base material layer is preferably 100% or more, more preferably 120% or more, still more preferably 150% or more. When the elongation of the base material layer is 100% or more, the anti-fouling pressure-sensitive adhesive sheet can satisfactorily follow the shapes of various structures and be satisfactorily attached onto a flat surface. In addition, the sheet can be satisfactorily attached onto a bent portion (such as a curved surface portion, 90°-angle portion, or acute angle portion present on the surface of a ship hull). When the elongation of the base material layer is less than 100%, there is a possibility that the sheet cannot sufficiently follow the shapes of the various structures, and hence a wrinkle or a non-adhesion portion of a pressure-sensitive adhesive occurs, which may be responsible for an external appearance failure or an adhesion failure. An upper limit for the elongation of the base material layer is preferably 2,000% or less from the viewpoint of the strength of the base material layer.

The rupture point stress of the base material layer is preferably 10 MPa or more, more preferably 12 MPa or more, still more preferably 15 MPa or more. When the rupture point stress of the base material layer is less than 10 MPa, there is a possibility that the base material layer is frequently cut upon peeling of the anti-fouling pressure-sensitive adhesive sheet that has already been used from a structure, and hence working efficiency may remarkably deteriorate.

The elongation and rupture point stress of the base material layer can be measured in conformity with JIS 7161, JIS 7162, and JIS 7172.

The modulus of elasticity of the base material layer is preferably 4,000 MPa or less, more preferably 1,000 MPa or less, still more preferably 100 MPa or less, particularly preferably 50 MPa or less. When the modulus of elasticity of the base material layer is 4,000 MPa or less, the anti-fouling pressure-sensitive adhesive sheet can satisfactorily follow the shapes of various structures and hence its attachment property improves. A lower limit for the modulus of elasticity of the base material layer is preferably 0.1 MPa or more from the viewpoint of the handleability of the base material layer.

The base material layer may contain any appropriate additive to the extent that the effects of the present invention are not impaired. Examples of such additive include an olefin-based resin, a silicone-based polymer, a liquid acrylic copolymer, a tackifier, an antioxidant, a hindered amine-based light stabilizer, a UV absorbing agent, an antioxidizing agent, an antistatic agent, polyethylene imine, a fatty acid amide, a fatty acid ester, a phosphoric acid ester, a lubricant, a surfactant, a filler, and a pigment (such as calcium oxide, magnesium oxide, silica, zinc oxide, titanium oxide, or carbon black).

The base material layer preferably contains a UV absorbing agent. When the base material layer contains the UV absorbing agent, the weatherability of the anti-fouling pressure-sensitive adhesive sheet improves. When the base material layer does not contain any UV absorbing agent, there is a possibility that the base material is liable to deteriorate owing to sunlight in outdoor use and hence it may become difficult to maintain the original base material strength. In addition, when the base material deteriorates, there is a possibility that the base material layer is frequently cut upon peeling of the anti-fouling pressure-sensitive adhesive sheet that has already been used from a structure, and hence working efficiency may remarkably deteriorate.

Any appropriate thickness may be adopted as the thickness of the base material layer depending on applications, a use environment, and the like. The thickness of the base material layer is preferably from 20 to 500 μm. When the thickness of the base material layer is less than 20 μm, the layer may not be practical because its handleability deteriorates and hence the layer cannot serve as a base material. When the thickness of the base material layer is more than 500 μm, there is a risk in that the sheet cannot sufficiently follow the shape of a structure, unevenness at the overlapping portions of the sheets enlarges, and the portions are liable to be fouled.

A portion of the base material layer on which the anti-fouling layer is provided may have a primer applied thereonto in advance in order to improve its adhesiveness with the anti-fouling layer. In addition, the base material layer may have a silane coupling agent added thereto in advance. For example, when the anti-fouling layer contains a silicone resin, its adhesiveness with the base material layer may be low owing to low surface energy as a characteristic of the silicone resin. When the adhesiveness between the anti-fouling layer and the base material layer is low, there is a possibility that the anti-fouling layer that exhibits an anti-fouling effect peels from the base material layer owing to impact or physical damage during use, and hence it may be impossible to maintain its original anti-fouling effect. Accordingly, the primer can be applied onto the surface of the base material layer in advance to improve the adhesiveness with the anti-fouling layer, or a silanol group or alkoxysilane group that reacts with the silicone resin can be introduced into the base material layer by adding the silane coupling agent and subjected to condensation reaction with a condensation-type silicone resin applied on the base material layer to improve the adhesiveness.

The number of kinds of the silane coupling agents may be only one, or may be two or more. As a specific silane coupling agent that is commercially available, there are given, for example, KBM 5103, KBM 1003, KBM 903, KBM 403, and KBM 802 manufactured by Shin-Etsu Chemical Co., Ltd.

When the base material layer contains the silane coupling agent, the content of the silane coupling agent in the base material layer is preferably from 0.01 to 10 wt %. When the content of the silane coupling agent in the base material layer exceeds 10 wt %, the silane coupling agent may serve as a cross-linking point to make the base material layer hard. When the content of the silane coupling agent in the base material layer is less than 0.01 wt %, sufficient adhesiveness may not be expressed between the base material layer and the anti-fouling layer.

The surface of the base material layer on the side on which the pressure-sensitive adhesive layer is provided may be subjected to easy-adhesion treatment. Subjecting the surface to the easy-adhesion treatment can suppress an adhesive residue upon peeling and removal of the anti-fouling pressure-sensitive adhesive sheet. The easy-adhesion treatment includes, for example, the same treatment as treatment to be performed on the base material layer-side surface of the bonding margin.

<A-4. Pressure-sensitive Adhesive Layer>

Any appropriate pressure-sensitive adhesive layer may be adopted as the pressure-sensitive adhesive layer to the extent that the effects of the present invention are not impaired. Examples of a material for such pressure-sensitive adhesive layer include an acrylic resin-based pressure-sensitive adhesive, an epoxy resin-based pressure-sensitive adhesive, an amino resin-based pressure-sensitive adhesive, a vinyl resin (e.g., vinyl acetate-based polymer)-based pressure-sensitive adhesive, a curable acrylic resin-based pressure-sensitive adhesive, and a silicone resin-based pressure-sensitive adhesive. The number of kinds of the materials for the pressure-sensitive adhesive layer may be only one, or may be two or more.

The 180° peeling adhesive strength of the pressure-sensitive adhesive layer at 23° C. and a tension speed of 300 mm/min is preferably 30 N/20 mm or less, more preferably 20 N/20 mm or less, still more preferably 15 N/20 mm or less. When the 180° peeling adhesive strength of the pressure-sensitive adhesive layer at 23° C. and a tension speed of 300 ram/min exceeds 30 N/20 mm, there is a possibility that it becomes difficult to peel the anti-fouling pressure-sensitive adhesive sheet that has already been used from a structure, and hence the working efficiency may remarkably deteriorate. A lower limit for the 180° peeling adhesive strength of the pressure-sensitive adhesive layer at 23° C. and a tension speed of 300 mm/min is preferably 5 N/20 mm or more from the viewpoint that a sufficient pressure-sensitive adhesive strength can be secured.

The 180° peeling adhesive strength of the pressure-sensitive adhesive layer may be measured, for example, as described below. That is, the pressure-sensitive adhesive layer is laminated on a base material to produce a pressure-sensitive adhesive sheet and the sheet is cut into a test piece having a size measuring 80 mm by 20 mm. A plastic FRP plate reinforced by loading glass cloth into an epoxy resin measuring 30 mm wide by 100 mm long by 2 mm thick is used as an adherend. The test piece is attached onto the adherend by reciprocating a 2-kg roller once and the resultant is left to stand at 23° C. for 30 minutes. After that, its initial 180° peeling adhesive strength is measured at a tension speed of 300 mm/min.

When the pressure-sensitive adhesive layer is brought into contact with seawater, the compressive modulus of elasticity of a portion in the pressure-sensitive adhesive layer brought into contact with the seawater is preferably 1.1 times or more, more preferably 1.2 times or more, still more preferably 1.5 times or more as large as a compressive modulus of elasticity in the pressure-sensitive adhesive layer before the contact with the seawater. When the compressive modulus of elasticity of the portion in the pressure-sensitive adhesive layer brought into contact with the seawater upon bringing of the pressure-sensitive adhesive layer into contact with the seawater is 1.1 times or more as large as the compressive modulus of elasticity in the pressure-sensitive adhesive layer before the contact with the seawater, the layer can express its good adhesion even in water. An upper limit for the ratio of the compressive modulus of elasticity of the portion in the pressure-sensitive adhesive layer brought into contact with the seawater upon bringing of the pressure-sensitive adhesive layer into contact with the seawater to the compressive modulus of elasticity in the pressure-sensitive adhesive layer before the contact with the seawater is preferably 100 times or less from the viewpoint of its handleability.

Any appropriate thickness may be adopted as the thickness of the pressure-sensitive adhesive layer depending on applications, a use environment, and the like. The thickness of the pressure-sensitive adhesive layer is preferably 10 µm or more. When the thickness of the pressure-sensitive adhesive layer is less than 10 µm, there is a risk in that the layer cannot sufficiently follow the shape of a structure, its adhesion area reduces, and the layer cannot express a sufficient pressure-sensitive adhesive strength. An upper limit for the thickness of the pressure-sensitive adhesive layer is preferably 100 µm or less from the viewpoint of the handleability.

<A-5. Anti-fouling Layer>

Any appropriate anti-fouling layer may be adopted as the anti-fouling layer to the extent the effects of the present invention are not impaired. From the viewpoint of suitably preventing the adhesion of dirt or the like, the anti-fouling layer preferably has a poorly adhesive surface.

A material for forming the anti-fouling layer includes, for example, a resin having a small surface energy such as a fluorine-based resin, a silicone-based resin, a melamine-based resin, or an acrylic resin.

The anti-fouling layer preferably further contains an anti-fouling agent. The number of kinds of the anti-fouling agents may be only one, or may be two or more. When the anti-fouling layer contains the anti-fouling agent, its high anti-fouling effect can be maintained for a long time period because the anti-fouling agent migrates to the surface of the resin as a matrix and covers the surface.

Any appropriate anti-fouling agent may be adopted as the anti-fouling agent to the extent that the effects of the present invention are not impaired. Examples of such anti-fouling agent include a silicone oil, liquid paraffin, a surfactant, a wax, petrolatum, animal fats, and a fatty acid. The anti-fouling agent that may be used in the present invention is preferably at least one kind selected from the silicone oil, the liquid paraffin, and the surfactant. In one embodiment, the anti-fouling layer may be a silicone-based resin layer or fluorine-based resin layer containing a silicon oil and/or liquid paraffin.

Examples of the silicone oil include: KF96L, KF96, KF69, KF99, KF50, KF54, KF410, KF412, KF414, and FL manufactured by Shin-Etsu Chemical Co., Ltd; and BY16-846, SF8416, SH203, SH230, SF8419, FS1265, SH510, SH550, SH710, FZ-2110, and FZ-2203 manufactured by Dow Corning Toray Co., Ltd.

Examples of the surfactant include an anionic surfactant, a cationic surfactant, and a nonionic surfactant.

A diatom adhesion-preventing agent, an agricultural chemical, a drug (such as medetomidine), an enzyme activity inhibitor (such as an alkylphenol or an alkylresorcinol), or an organism repellent may be used as the anti-fouling agent. The use of any such anti-fouling agent additionally improves a preventing effect on the adhesion of an aquatic organism such as a diatom or a barnacle.

In the anti-fouling layer, the content of the anti-fouling agent with respect to the resin is preferably 2 wt % or more, more preferably from 2 to 200 wt %, still more preferably from 3 to 150 wt %, particularly preferably from 4 to 120 wt %, most preferably from 5 to 100 wt %. When the content of the anti-fouling agent with respect to the resin is less than 2 wt %, there is a risk in that the anti-fouling effect of the anti-fouling layer cannot be sufficiently expressed. When the content of the anti-fouling agent with respect to the resin is more than 200 wt %, there is a risk in that a finished formed article or coating may have a poor external appearance, and there is also a risk in that the strength of the anti-fouling layer may be reduced to prevent the sustenance of anti-fouling property.

The anti-fouling layer may contain any appropriate other additive to the extent that the effects of the present invention are not impaired.

In addition, a commercially available paint composition may be used as the material for forming the anti-fouling layer. Examples of the commercially available paint composition include products sold under the trade names "Peller Clean" and "Bioclean" manufactured by CHUGOKU MARINE PAINTS, LTD. and a product sold under the trade name "Everclean" manufactured by NKM Coatings Co., Ltd.

Any appropriate thickness may be adopted as the thickness of the anti-fouling layer depending on applications, a use environment, and the like. The thickness of the anti-fouling layer is preferably from 5 to 500 µm. When the thickness of the anti-fouling layer is less than 5 µm, there is a possibility that the layer may not be practical because the time period for which its anti-fouling effect effectively works shortens. When the thickness of the anti-fouling layer is more than 500 µm, the anti-fouling pressure-sensitive adhesive sheet becomes thick and increases in weight. Accordingly, there is a risk in that its handleability deteriorates, unevenness at the overlapping portions of the sheets enlarges, and the portions are liable to be fouled.

<A-6. Manufacturing Method for Anti-fouling Pressure-sensitive Adhesive Sheet>

The anti-fouling pressure-sensitive adhesive sheet may be manufactured by any appropriate method. Examples of such method include: a method involving separately preparing the base material layer and the pressure-sensitive adhesive layer, followed by bonding thereof onto each other, and then applying a material for forming the anti-fouling layer onto the base material layer in such a manner that untreated portions (which become bonding margins in the end) are left at end portions of one or more sides, to thereby form the anti-fouling layer; a method involving applying a material for forming the pressure-sensitive adhesive layer onto one surface of the base material layer to form the pressure-sensitive adhesive layer, and then applying a material for forming the anti-fouling layer onto the other surface of the base material layer in such a manner that untreated portions are left at end portions of one or more sides, to thereby form the anti-fouling layer; and a method involving coextruding a material for forming the base material layer and a material for forming the pressure-sensitive adhesive layer to form a laminate of the base material layer/the pressure-sensitive adhesive layer, and then applying a material for forming the anti-fouling layer onto the base material layer in such a manner that untreated portions are left at end portions of one or more sides, to thereby form the anti-fouling layer.

A method of applying the material for forming the anti-fouling layer onto the base material layer is, for example, a spray, brush application, a roller, a curtain flow, a roll, or dipping. The anti-fouling layer may be formed by applying the material for forming the anti-fouling layer onto the base material layer according to any such method and drying the material at, for example, a temperature of from room temperature to 250° C. (preferably a temperature of from room temperature to 180° C.)

A method of forming the inclined surface at the end portion of the bonding margin is exemplified by: cutting after the formation and curing of the base material layer; forming with a squeegee during the formation and curing; causing an edge to sag; sagging at an applied end portion caused by a flow at the time of application; tapering an end portion of the application liquid-ejecting portion of a coater to continuously reduce an amount to be ejected to an end portion; and the like. In addition, methods similar to the above-mentioned ones may each be used as a method of forming the inclined surface at the end portion of the anti-fouling layer on the bonding margin side.

<B. Anti-fouling Treatment Method>

Figure 4:
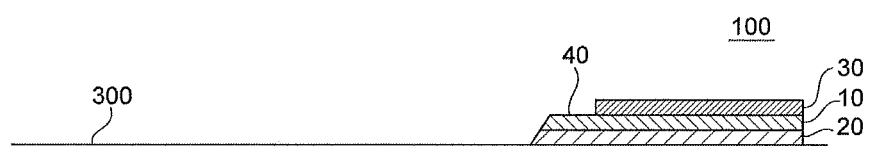
FIG. 4 is a schematic diagram illustrating an anti-fouling treatment method according to a preferred embodiment of the present invention.
Figure 4:
Figure 4:
Figure 4:
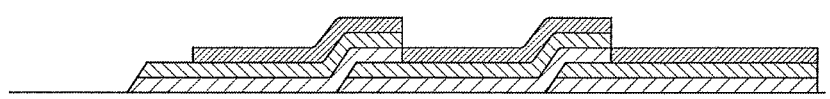

FIG. 4 is a schematic diagram illustrating an anti-fouling treatment method of the present invention. The anti-fouling treatment method of the present invention includes sequentially attaching a plurality of the anti-fouling pressure-sensitive adhesive sheets onto a surface of a structure 300 to be subjected to anti-fouling treatment so that the bonding margin 40 of one anti-fouling pressure-sensitive adhesive sheet 100 is overlapped by the pressure-sensitive adhesive layer 20 surface of an adjacent other anti-fouling pressure-sensitive adhesive sheet 100. It is preferred that an overlapping width be equal to or larger than the width of the bonding margin. When the sheets are allowed to overlap each other in this manner, the structure can be covered with the anti-fouling layer without any gap, and hence an anti-fouling effect can be obtained uniformly.

Figure 5:
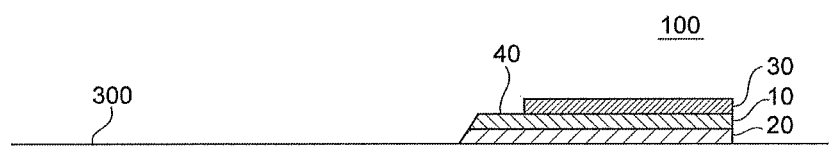
FIG. 5 is a schematic diagram illustrating an anti-fouling treatment method according to another preferred embodiment of the present invention.
Figure 5:
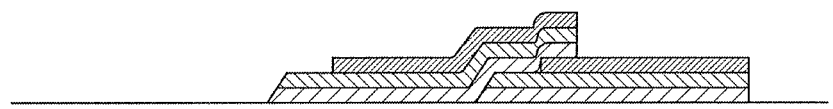
Figure 5:
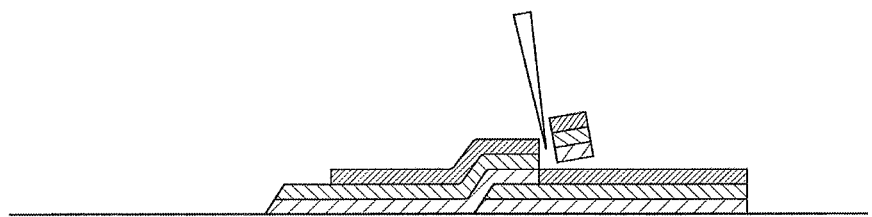

In a preferred embodiment, as exemplified in FIG. 5, the sheets are allowed to overlap each other so that the overlapping width may be larger than the width of the bonding margin 40, and then an overlapping portion beyond the bonding margin is cut off. When the sheets are attached in this manner, precise positioning becomes unnecessary, and hence workability at the time of the attachment can be improved.

The structure to be subjected to anti-fouling treatment may be any appropriate structure as long as the structure has the surface to be prevented from being fouled. Examples of the structure include underwater structures such as a ship, a buoy, a harbor facility, a maritime oil field facility, a cooling water supply line for a powerplant, and a cooling water supply line for a factory, a propeller for wind power generation, a bridge pier, a building, an automobile, heavy machinery, and aircrafts.

EXAMPLES

The present invention is described below by way of Examples. However, the present invention is not limited thereto.

Example 1

(Base Material Layer)

A reaction vessel was charged with 71 parts by weight of isobornylacrylate (manufactured by Osaka Organic Chemical Industry Ltd.), 19 parts by weight of n-butyl acrylate (manufactured by TOAGOSEI CO., LTD.), 68.4 parts by weight of poly(oxytetramethylene) glycol (manufactured by Mitsubishi Chemical Corporation), 0.01 part by weight of dibutyltin dilaurate, and 25.5 parts by weight of hydrogenated xylylene diisocyanate (manufactured by Mitsui Chemical Polyurethane), and the contents were mixed. The mixture was polymerized at 65° C. for 5 hours. Thus, a mixture 1 was obtained.

To the obtained mixture 1 were added 1 part by weight of 3-acryloxypropyltrimethoxysilane (manufactured by Shin-Etsu Chemical Co., Ltd.), 5 parts by weight of trimethylolpropane triacrylate, 0.25 part by weight of diphenyl(2,4,6,-trimethoxybenzoyl)phosphine oxide (manufactured by BASF), 1.25 parts by weight of a product sold under the trade name "TINUVIN 123" (manufactured by BASF), and 0.6 part by weight of a product sold under the trade name "TINUVIN 400" (manufactured by BASF), and the contents were mixed to obtain a syrup 1.

The obtained syrup 1 was applied onto a surface of a separator (trade name: "MRF38", Mitsubishi Plastics, Inc.) so as to have a thickness of 150 µm, to thereby form a syrup layer. Under a nitrogen-purged environment, the syrup layer was irradiated with UV light (irradiance: 3.4 mW/cm$^2$, cumulative dose: 2,000 mJ/cm$^2$) using a UV lamp (black light) so as to be polymerized and cured. Thus, a base material layer was obtained.

(Pressure-sensitive Adhesive Layer)

A reaction vessel was charged with 90 parts by weight of 2-ethylhexyl acrylate, 10 parts by weight of acrylic acid, and 0.1 part by weight of a photopolymerization initiator (trade name: "IRGACURE 651", manufactured by BASF), and the contents were mixed. The stirred mixture was irradiated with UV light to cause UV polymerization until a viscosity with which the mixture could be applied was achieved. 0.08 part by weight of 1,6-hexanediol diacrylate was added to the resultant mixture, and the contents were mixed. The mixture was applied onto a surface of a separator (trade name: "MRF38", manufactured by Mitsubishi Plastics, Inc.) so as to have a thickness of 50 µm. Under a nitrogen-purged environment, the applied layer was irradiated with UV light (irradiance: 3.4 mW/cm$^2$, cumulative dose: 2,000 mJ/cm$^2$) using a UV lamp (black light) so as to be polymerized and cured. Thus, a pressure-sensitive adhesive layer was obtained.

(Anti-fouling Pressure-sensitive Adhesive Tape)

An anti-fouling paint composition (manufactured by CHUGOKU MARINE PAINTS, LTD., product name: "Peller Clean") was applied onto one surface of the base material layer with an applicator so as to have a thickness after drying of 100 µm, and was dried at 150° C. for 10 minutes to form an anti-fouling layer. In this case, the width of the base material was 200 mm and the width of the applicator used for the application of the anti-fouling layer was 180 mm, and thus a 20-mm-wide unapplied portion (bonding margin) was left at one end portion of the base material. The formed anti-fouling layer had an inclination angle of about 30° at an end portion thereof due to sagging caused by a flow at the time of the drying. Next, the pressure-sensitive adhesive layer was attached onto the other surface of the base material layer to obtain an anti-fouling pressure-sensitive adhesive tape 1. The obtained anti-fouling pressure-sensitive adhesive tape 1 had the construction "anti-fouling layer (thickness: 100 µm)/base material layer (thickness: 150 µm)/pressure-sensitive adhesive layer (thickness: 50 µm)."

The anti-fouling pressure-sensitive adhesive tape 1 was attached by a method as illustrated in FIG. 5. Specifically, the anti-fouling pressure-sensitive adhesive tape 1 was attached onto a boat having a steel plate surface having an anti-corrosive paint (manufactured by CHUGOKU MARINE PAINTS, LTD., product name: "BANNOH 500") applied thereonto. Next, a second anti-fouling pressure-sensitive adhesive tape 1 was attached so as to exceed the 20-mm bonding margin of the former anti-fouling pressure-sensitive adhesive tape 1 by about 20 mm, and an overlapping portion beyond the bonding margin was cut and removed. After that, the resultant was left to stand under a state in which the attachment site was immersed in seawater, and observed for a change with time. However, the overlapping portions were in firm adherence and no change was found in the attachment state. In addition, when an attempt was made to peel the anti-fouling pressure-sensitive adhesive tapes from the boat body, peeling did not occur at the overlapping portions because the overlapping boundary between the two tapes was firmly integrated. On the other hand, it was possible to peel the tapes from the boat body.

Example 2

An anti-fouling pressure-sensitive adhesive tape 2 having a 30-mm-wide bonding margin was obtained in the same manner as in Example 1 except that: the width of the unapplied portion of the anti-fouling paint composition was changed to 30 mm; and the unapplied portion was subjected to corona treatment.

The anti-fouling pressure-sensitive adhesive tape 2 was attached onto an FRP boat in the same manner as in Example 1. After that, the resultant was left to stand under a state in which the attachment site was immersed in seawater, and observed for a change with time. However, the overlapping portions were in firm adherence and no change was found in the attachment state. In addition, when an attempt was made to peel the anti-fouling pressure-sensitive adhesive tapes from the boat body, peeling did not occur at the overlapping portions because the overlapping boundary between the two tapes was firmly integrated. On the other hand, it was possible to peel the tapes from the boat body.

Example 3

(Pressure-sensitive Adhesive Layer)

A reaction vessel equipped with a cooling tube, a nitrogen inlet tube, a thermometer, and a stirrer was charged with 90 parts by weight of 2-ethylhexyl acrylate (2EHA, manufactured by TOAGOSEI CO., LTD.) and 10 parts by weight of acrylic acid (AA) as (meth)acrylic monomers, and 0.1 part by weight of 2,2-dimethoxy-1,2-diphenylethan-1-one (trade name: "IRGACURE 651", manufactured by BASF) as a photopolymerization initiator, and the contents were dispersed. The stirred dispersion was irradiated with UV light from above in a stream of nitrogen to convert part of the monomers into a polymer, to thereby adjust the viscosity of the dispersion so that the dispersion could be applied. Thus, a (meth)acrylic monomer mixture was obtained. To the (meth)acrylic monomer mixture, 0.08 part by weight of 1,6-hexanediol diacrylate (HDDA) was added as a cross-linking agent. The mixture was applied onto a surface of a separator (trade name: "MRF38", manufactured by Mitsubishi Plastics, Inc., thickness: 50 μm) with an applicator, a cover separator (trade name: "MRF38", manufactured by Mitsubishi Plastics, Inc., thickness: 38 μm) was attached onto the mixture with a hand roller, and the resultant was irradiated with UV light using a UV lamp (BL type) (UV irradiance: 3.4 mW/cm$^2$, cumulative dose: 2,000 mJ/cm$^2$) to obtain a pressure-sensitive adhesive layer having a thickness of 50 μm.

(Base Material Layer)

A urethane resin base material (manufactured by Sheedom Co., Ltd., product name: "DUS 451", thickness: 100 μm, width: 250 mm) was used as a base material layer.

(Anti-fouling Layer)

Onto the base material layer was applied a mixed liquid obtained by mixing an addition-type silicone elastomer (manufactured by Wacker Asahikasei Silicone Co., Ltd., product name: "LR 7665"), liquid paraffin (manufactured by Wako Pure Chemical Industries, Ltd.), and a silane coupling agent (manufactured by Shin-Etsu Chemical Co., Ltd., product name: "KBM 5103") at a ratio of 100:10:5 with an applicator to form a syrup layer having a thickness of 100 μm. The syrup layer was cured by treatment at 150° C. for 5 minutes to form an anti-fouling layer on the base material layer. It should be noted that the formed anti-fouling layer had a width of 180 mm, and both end portions of the base material layer were left as unapplied portions (bonding margins) on which the anti-fouling layer was not provided.

(Anti-fouling Pressure-sensitive Adhesive Tape)

The pressure-sensitive adhesive layer and the base material layer with an anti-fouling layer were attached onto each other with a hand roller, and then one of the untreated portions at both ends on which the anti-fouling layer was not provided was cut off. Thus, an anti-fouling pressure-sensitive adhesive tape 3 having a 35-mm-wide unapplied portion (bonding margin) at one end portion thereof was obtained. The obtained anti-fouling pressure-sensitive adhesive tape 3 had the construction "anti-fouling layer (thickness: 100 μm)/base material layer (thickness: 100 μm)/pressure-sensitive adhesive layer (thickness: 50 μm)."

The anti-fouling pressure-sensitive adhesive tape 3 was attached onto a boat having a steel plate surface having an anti-corrosive paint (manufactured by CHUGOKU MARINE PAINTS, LTD., product name: "BANNOH 500") applied thereonto in the same manner as in Example 1. Evaluation was performed in the same manner as in Example 1. As a result, an effect comparable to that in Example 1 was obtained.

Comparative Example 1

An anti-fouling pressure-sensitive adhesive sheet C1 having no bonding margin was obtained in the same manner as in Example 1 except that the anti-fouling paint composition was applied onto the entire surface of the base material layer.

The obtained anti-fouling pressure-sensitive adhesive sheet C1 was attached onto a steel plate (thickness: 2 mm) having an anti-fouling paint composition (manufactured by CHUGOKU MARINE PAINTS, LTD., product name: "Peller Clean") applied thereonto at a thickness of 150 μm by allowing end portions to abut on each other so as not to generate any gap at the boundary. After that, the steel plate was immersed in artificial seawater and left to stand therein. As a result, a gap was generated at the boundary owing to the shrinkage of the base material due to relaxation of stress at the time of the attachment.

Comparative Example 2

An anti-fouling pressure-sensitive adhesive sheet C2 having no bonding margin was obtained in the same manner as in Comparative Example 1.

The obtained anti-fouling pressure-sensitive adhesive sheet C2 was attached onto a steel plate (thickness: 2 mm) having an anti-fouling paint composition (manufactured by CHUGOKU MARINE PAINTS, LTD., product name: "BANNOH 500") applied thereonto by allowing end portions to overlap each other with an overlapping width of 30 mm. After that, the steel plate was immersed in artificial seawater and left to stand therein. As a result, at the overlapping portions, the upper sheet were peeled from the under sheet.

INDUSTRIAL APPLICABILITY

The anti-fouling pressure-sensitive adhesive sheet and anti-fouling treatment method of the present invention can each be suitably applied to the prevention of the fouling of the surface of a structure.

REFERENCE SIGNS LIST

100, 200 anti-fouling pressure-sensitive adhesive sheet
10 base material layer
20 pressure-sensitive adhesive layer
30 anti-fouling layer
40 bonding margin
50 release film

The invention claimed is:

1. An anti-fouling treatment method for a structure, comprising sequentially attaching three or more anti-fouling pressure-sensitive adhesive sheets onto a surface of a structure to be subjected to anti-fouling treatment so that a bonding margin of a preceding anti-fouling pressure-sensitive adhesive sheet is overlapped by a pressure-sensitive adhesive layer surface of a succeeding anti-fouling pressure-sensitive adhesive sheet,
wherein each anti-fouling pressure-sensitive adhesive sheet comprises a base material layer; a pressure-sensitive adhesive layer provided on one side of the base material layer; and an anti-fouling layer provided on another side of the base material layer,
wherein the anti-fouling pressure-sensitive adhesive sheet has, at only one end portion thereof, the bonding margin including parts of the base material layer and the pressure-sensitive adhesive layer, the parts extending beyond the anti-fouling layer, and
wherein an adhesive strength between the base material layer-side surface of the bonding margin and the pressure-sensitive adhesive layer is higher than an adhesive strength between the surface of the structure to be subjected to anti-fouling treatment and the pressure-sensitive adhesive layer.

2. The anti-fouling treatment method for a structure according to claim 1, wherein the bonding margin is overlapped by the pressure-sensitive adhesive layer surface so that an overlapping width of the anti-fouling pressure-sensitive adhesive sheets is larger than a width of the bonding margin, and
wherein the anti-fouling treatment method further comprises cutting off an overlapping portion beyond the bonding margin.

3. The anti-fouling treatment method for a structure according to claim 1, wherein the bonding margin has a base material layer-side surface thereof subjected to easy-adhesion treatment.

4. The anti-fouling treatment method for a structure according to claim 1, wherein the bonding margin has, at an end portion thereof, an inclined surface that is inclined so as to have a thickness decreasing from a base material layer-side surface toward a pressure-sensitive adhesive layer-side surface.

5. The anti-fouling treatment method for a structure according to claim 1, wherein the anti-fouling layer is a silicone-based resin layer or fluorine-based resin layer each containing a silicon oil and/or liquid paraffin.

6. The anti-fouling treatment method for a structure according to claim 1, wherein a 180° peeling adhesive strength of the pressure-sensitive adhesive layer at 23° C. and a tension speed of 300 mm/min is 15 N/20 mm or less, and a 180° peeling adhesive strength between the base material layer-side surface of the bonding margin and the pressure-sensitive adhesive layer at 23° C. and a tension speed of 300 mm/min is 20N/20 mm or more.

* * * * *